United States Patent

[11] 3,530,940

| [72] | Inventors | Dwight L. Dauben |
| | | Syed H. Raza, Tulsa, Oklahoma |
| [21] | Appl. No. | 796,904 |
| [22] | Filed | Feb. 5, 1969 |
| [45] | Patented | Sept. 29, 1970 |
| [73] | Assignee | Pan American Petroleum Corporation, Tulsa, Okla., a corporation of Delaware |

[54] INCREASING FOAM STABILITY IN EARTH FORMATIONS
9 Claims, No Drawings

[52] U.S. Cl.......................................... 166/305, 166/309
[51] Int. Cl........................................E21b 33/138
[50] Field of Search............................... 166/305, 294, 309, 285; 175/68, 69, 72; 252/8.55; 61/36

[56] References Cited
UNITED STATES PATENTS

| 2,832,414 | 4/1958 | Battle............................. | 166/294 |
| 3,111,998 | 11/1963 | Crowley........................ | 175/68 |
| 3,120,266 | 2/1964 | Martin et al. ................. | 166/309 |
| 3,215,200 | 11/1965 | Kirkpatrick et al........... | 175/69X |
| 3,229,777 | 1/1966 | Rogers et al.................. | 166/309X |
| 3,251,417 | 5/1966 | Holman et al. ............... | 166/309X |
| 3,330,351 | 7/1967 | Bernard......................... | 166/305 |
| 3,342,261 | 9/1967 | Bond............................. | 166/305X |
| 3,379,260 | 4/1968 | O'Brien......................... | 166/309X |
| 3,464,491 | 9/1969 | Froning......................... | 166/294 |

*Primary Examiner*—Stephen J. Novosad
*Attorneys*—Paul F. Hawley and Buell B. Hamilton

ABSTRACT: Film-forming, water-soluble polymers are used with aqueous foaming agent solutions to form foams in earth formations. The polymers stabilize the foams against the adverse effects of oil and high temperatures. The foams can be further stabilized by adding plasticizers, such as glycerine, to the polymer-containing foaming agent solutions. Suitable polymers are polyvinyl alcohols and polyvinyl pyrrolidones.

INCREASING FOAM STABILITY IN EARTH FORMATIONS

It has been proposed to use foams to plug earth formations such as oil-bearing formations for various reasons. Most of such foams have been formed by injecting an aqueous solution of a water-soluble foaming agent and then injecting gas or allowing gas to flow back through the solution to form the foam within the pores of the formation. Such foams are generally of a temporary nature. Foam stability is decreased by contact with the exposed formation surfaces, by contact with oil in the formation, and by the elevated temperatures of some earth formations.

An object of this invention is to provide a more stable foam in earth formations. Another object is to provide a method for plugging an earth formation with a more stable foam. A more specific object is to plug an oil-bearing earth formation with a foam which is more stable in the presence of oil. Another specific object is to provide a foam plug in the formation around a well penetrating the formation, the plug extending into the formation to a depth of several feet from the well. Still another specific object is to provide a method for plugging an earth formation with a foam which is more stable at elevated temperatures.

In general, we accomplish the objects of our invention by adding to the aqueous foaming agent solution a water-soluble film-forming polymer, such as polyvinyl alcohol, or a polyvinyl pyrrolidone. An additional benefit can be obtained by adding a plasticizer, such as glycerine, together with the polymer.

A possible explanation for the observed increase in stability may lie in a tendency for the polymers to concentrate at liquid-gas interfaces. The cohesive forces between molecules, which accounts for the polymers' forming films rather than powders, are probably also active in the interfacial layer or film of foaming agent and polymer to strengthen this film. While this theory may explain the action of the film-forming polymers, we do not, of course, wish to be limited to this theory.

The stabilizing action of the polymers will be apparent from the following examples.

EXAMPLE 1

A tube 18 inches long and 1.5 inches in diameter was packed with silica sand of substantially uniform size grains barely passing a No. 16 U.S. standard sieve. The resulting permeability was about 3,000 millidarcys. The sand-packed tube was filled with one-quarter normal sodium chloride brine. A foaming-agent solution was then forced into one end of this brine-filled pack. The solvent for the foaming-agent solution was one-quarter normal sodium chloride brine. The volume of foaming-agent solution was about one-quarter of the pore volume of the sand pack. The foaming-agent solution was followed by nitrogen gas at a constant pressure of about 7.5 pounds per square inch gauge. The downstream end of the tube was open to atmospheric pressure. Two foaming agents were used. Foaming agent A was a complex mixture of ingredients known as "OK Liquid" and defined in U.S. Pat. No. 3,330,346 Jacobs et al. Foaming agent B was nonyl phenol ethoxylated with about 4 mols of ethylene oxide per mol of nonyl phenol and then sulfated. Each of the two foaming agents was tested with and without a film-forming polymer. In every case, the temperature was about 76°F., the foaming agent and polymer concentrations were each 2 percent by weight and, each time a polymer was used, 2 percent by weight of glycerine was also included. Two measurements were made. One was the percent of brine displaced by the gas at the time gas broke through at the downstream end of the sand-packed tube. The other measurement was the time required for the gas to break through. Results are presented in table I.

TABLE I

|  | Foaming Agent "A" | | Foaming Agent "B" | |
| --- | --- | --- | --- | --- |
|  | Without polymer | With polymer | Without polymer | With polymer |
| Breakthrough displacement efficiency, percent. | 75.5 | 77.0 | 73.0 | 77.0 |
| Breakthrough time, minutes | 1,700 | 3,350. | 345 | 2,500 |

The beneficial effects of the polymer and glycerine are obvious from the table. In both cases, the polymer was a high molecular weight polyvinyl alcohol polymerized to such an extent that a 4 percent aqueous solution at 20°C. had a viscosity of about 35 to 45 centipoises as measured by the Hoeppler falling ball method. The polyvinyl alcohol was produced by polymerizing polyvinyl acetate and hydrolizing about 88 percent of the acetate groups. Thus, the polymer was actually a copolymer of vinyl alcohol and vinyl acetate, although such highly hydrolized polymers are ordinarily referred to as simply polyvinyl alcohols. When used herein, the term "polyvinyl alcohol" will mean a polymer in which the ratio of alcohol to acetate groups is at least about 6 to 1.

EXAMPLE 2

The test of example 1, using OK Liquid, was repeated with the following changes:
1. The sand pack was larger (62 centimeters long by 12.7 centimeters in diameter);
2. The sand pack was first saturated with a narrow boiling petroleum fraction containing mostly hydrocarbons having from about 10 to about 12 carbon atoms per molecule, this fraction being followed by sufficient brine to reduce the oil content to a substantially irreducible minimum amount of about 17 percent of the pore volume;
3. The gas pressure at the inlet end was about 10 pounds per square inch gauge;
4. The amount of glycerine was about 4 percent by weight;
5. Gas flow was continued after breakthrough until the flow rate became substantially constant; and
6. After the gas flow rate became substantially constant, brine was injected until the brine flow rate became substantially constant.

Results are presented in table II.

TABLE II

|  | Without polymer | With polymer |
| --- | --- | --- |
| Stabilized flow rate, ml./min.: | | |
| With gas | 220 | 20 |
| With water | 30 | 10 |

The results in table II show that the effects of the polymer apply over varied conditions. The results also show that not only is the time required for gas to reach any point in the sand pack increased, as shown in table I, but the flow rate of gas is stabilized at a much lower value when the polymer is present. In addition, table II shows that the polymer-containing foam is effective for decreasing the flow of water as well as gas. Of most importance is the effectiveness of the polymer to increase the plugging action of the foam in the presence of oil.

EXAMPLE 3

The process of example 1 was repeated with the following exceptions:
1. The concentration of polymer was 4 percent by weight;
2. The concentration of glycerine was 10 percent by weight;
3. Stabilized gas flow rates were established and measured as described in example 2; and
4. The tests were conducted in a stainless steel tube at an average pressure of about 200 pounds per square inch, so the temperature could be increased.

Results are shown in table III.

TABLE III

| | Breakthrough time, Min. | | Stabilized gas flow rate, ml./min. | |
|---|---|---|---|---|
| | Without polymer | With polymer | Without polymer | With polymer |
| Temperature, °F.: | | | | |
| 190 | 65 | 7,240 | 0.43 | 0.002 |
| 300 | 18 | 660 | 18.6 | 0.02 |
| 400 | 3 | 5 | 83.3 | 33.3 |

The pronounced effects of the high concentration of polymer up to 300°F. is obvious from the data in table III. At higher temperatures, there are some effects but these effects become rather small at 400°F.

EXAMPLE 4

The process of example 1 was repeated at 300°F., as in example 3, except that:
1. Various concentrations of polymer and glycerine were used;
2. A second polymer was tested;
3. A smaller high pressure tube was used; and
4. The pressure gradient was increased giving more rapid results.

The results are presented in table IV.

TABLE IV

| | Concentration, percent | Breakthrough time, min. | Stabilized gas rate, ml./min. |
|---|---|---|---|
| Foaming composition: | | | |
| OK Liquid | 2 | 210 | 3,940 |
| OK Liquid<br>PVA | 2<br>2 | 240 | 4,000 |
| OK Liquid<br>PVA | 2<br>4 | 360 | 3,360 |
| OK Liquid<br>Glycerine | 2<br>4 | 225 | 3,450 |
| OK Liquid<br>Glycerine<br>PVA | 2<br>2<br>2 | 480 | 3,635 |
| OK Liquid<br>Glycerine<br>PVA | 2<br>4<br>4 | 455 | 3,350 |
| OK Liquid<br>PVP | 2<br>2 | 240 | 3,050 |
| OK Liquid<br>PVP | 2<br>4 | 370 | 3,550 |
| OK Liquid<br>Glycerine<br>PVP | 2<br>2<br>2 | 470 | 3,150 |

In table IV, "PVA" is the polyvinyl alcohol described in connection with example 1, and "PVP" is polyvinyl pyrrolidone, having a molecular weight of about 350,000.

The reasons for the difference in the results reported in tables III and IV are not completely understood. In general, they are thought to be due to differences in the packing of sand in the two different tubes and differences in pressure gradients. All results in each table are comparable since, after each run, the sand pack was washed with alcohol and brine until the foam broke and the original permeability was restored. Continued washing with large volumes of brine then removed the alcohol before the next test was run. In view of the different conditions in the tests reported in the two tables, however, the results in one table should not be compared to results in the other table. Even under the rather extreme conditions producing the results in table IV, it will be apparent that both polymers produced either a delayed gas breakthrough or a decreased stablized flow rate, and usually both, over a range of polymer concentrations and with various amounts of glycerine.

EXAMPLE 5

The method of example 2 was repeated using a smaller sand pack and a lower differential pressure across the pack. Variations were also made in the amounts of polymers and glycerine. The conditions and results of tests are shown in table V.

TABLE V

| Foaming composition | Concentration, percent | Core saturation, percent | | Breakthrough time, min. | Stabilized gas rate, ml./min. |
|---|---|---|---|---|---|
| | | $S_w$ | $S_o$ | | |
| None | | 83.2 | 16.8 | 45 | 60 |
| OK Liquid | 2 | 83.3 | 16.7 | 83 | 15.5 |
| OK Liquid<br>PVA | 2<br>4 | 83.3 | 16.7 | 450 | 0.3 |
| OK Liquid<br>Glycerine | 2<br>4 | 83.3 | 16.7 | 53 | 5.5 |
| OK Liquid<br>Glycerine<br>PVA | 2<br>2<br>2 | 83.3 | 16.7 | 165 | 1.0 |
| OK Liquid<br>Glycerine<br>PVA | 2<br>4<br>4 | 82.6 | 17.4 | 540 | 0.3 |
| OK Liquid<br>PVP | 2<br>4 | 83.3 | 16.7 | 610 | 0.5 |
| OK Liquid<br>Glycerine<br>PVP | 2<br>2<br>2 | 83.3 | 16.7 | 213 | 1.6 |

In the table, the terms "$S_w$" and "$S_o$" indicate the degree of saturation of the sand pack with water and oil, respectively. The conditions in examples 2 and 5 were sufficiently different so that no comparisons should be made between the results recorded in tables II and V. The results in table V show the stabilizing effects of film-forming polymers alone or in combination with glycerine in the presence of oil.

Many water-soluble polymers form films. Not all are usable in our process. Many of these, such as methyl cellulose, carboxy methyl cellulose, natural gums, such as Karaya, and the like, will not enter the pores of formations. In fact, these polymers are used in well-drilling fluids because they plaster over the exposed formations and prevent loss of water from the drilling fluid into the pores of the formation. Polymers of this sort are easily detected by setting up a small tube packed with sand, or a natural core, and attempting to pump an aqueous solution of the polymer through the sand pack or core. To be useful for our purposes, the polymer must, of course, flow easily through the sand pack or core. It must penetrate the formation to a distance of several feet, at least 2 or 3, and preferably 10 or 15 feet, if it is to stabilize foams for an effective distance into the formation.

The polymer must also be compatible with the foaming agent. For example, an anionic polymer should not be used with a cationic foaming agent. Sometimes an incompatibility exists for no apparent chemical reason. In such cases, the foaming agent apparently adversely affects the film-forming ability of the polymer, the polymer adversely affects the foam-forming ability of the surface active agent, or both, for reasons more physical than chemical. Therefore, before any large-scale use of a specific polymer with a particular foaming agent, a solution of the two should be injected into a core or sand pack and followed by gas to be sure the two are sufficiently compatible to form a stable foam.

OK Liquid, as defined in U.S. Pat. No. 3,340,346 Jacobs et al., is a complex mixture. This mixture is highly effective with certain polymers, such as polyvinyl alcohols and polyvinyl pyrrolidones. Another vinyl polymer is not compatible, however. This is the copolymer of methyl vinyl ether with maleic anhydride. Foams formed with OK Liquid and this copolymer are less stable than foams formed with OK Liquid alone.

A polymer cannot form a film at temperatures above its melting point. Therefore, the polymer must have a high enough molecular weight so that it will not melt at the formation temperature. In addition, the polymer must not decompose, that is, it must be stable at the formation temperature. It must also remain soluble in water to the extent of at least 1 or 2 percent at formation temperature, since at least about 1 percent must be present to provide an appreciable effect. Some polymers will not meet this requirement since they dissolve by forming hydrates which decompose at elevated temperatures dropping the polymers out of solution. For example, another reason why copolymers of methyl vinyl ether with maleic anhydride are unsatisfactory film-forming polymers under some conditions is that they form two phases at temperatures above about 150°F. Polymer stability at elevated temperatures is easily determined by placing a small sample of the polymer in a sealed tube in an oven at the temperature in question.

As the molecular weight of a polymer is increased, the viscosity of its aqueous solutions also increases. The molecular weight must be sufficiently low to form aqueous solutions with viscosities low enough to permit displacing at least a 1-percent solution of the polymer into the formation to be treated. The polymer concentration must also be sufficiently low to permit injecting the solution into the formation.

In summary, the polymer must be water-soluble to the extent of at least about 1 percent under conditions of use, must be capable of forming a film, must be stable at formation temperature, must have a molecular weight sufficiently high to provide a polymer melting point above the formation temperature, must have a molecular weight sufficiently low to provide a water solution viscosity low enough to be displaced into the formation, must be compatible with the foaming agent, and must be capable of penetrating the pores of the formation in water solution to a distance of several feet. Preferred polymers are polyvinyl alcohol and polyvinyl pyrrolidone since they can be obtained in molecular weight ranges which meet all these requirements.

The data in the examples show that use of the film-forming polymers without plasticizers stablizes foams. The data also show that additional improvements can also be made by adding a plasticizer. Several plasticizers are known for films of water-soluble polymers. These include not only glycerine but other organic materials such as ethylene glycol, polyethylene glycols, polypropylene glycols, formamide, sorbitol, and the like. Since glycerine is so compatible, inexpensive and effective, it is greatly preferred over other plasticizers. Not all plasticizers are compatible with all polymers and foaming agents. Compatibility should be checked at least by preparing a solution containing the foaming agent, polymer and plasticizer to be sure a single-phase solution results. Preferably, this solution should also be checked in a sand pack or core to be sure a stable foam is formed.

Foaming agents can, of course, be any of the many water-soluble foaming agents used in the past. OK Liquid, as defined in U.S. Pat. No. 3,330,346 Jacobs et al., is preferred at this time. Preliminary work with other agents indicates it may be possible to develop even better ones, particularly for special applications.

The gas can be air but preferably is a relatively inert gas, such as nitrogen, flue gas, methane, natural gas, or the like.

Foaming-agent solutions with the polymers and possibly also the plasticizers can be used in most of the ways in which foaming-agent solutions have been used in the past. For example, they can be used to plug gas-bearing zones to decrease coning of the gas down into oil-producing zones. They can also be used to plug highly permeable thief zones in oil-producing formations, and thus divert larger percentages of driving fluids into less permeable oil-bearing zones. The principle applications of our process are to increasing foam stability in oil-bearing formations and in high temperature formations.

Several variations and alternates are presented above. Many others can be used without departing from the spirit of the invention and the terms of the claims. For example, an oil solvent, such as propane, isopropanol, or the like, can precede the foaming-agent solution to reduce contact between the crude oil and relatively oil-sensitive foaming agents. A batch of water can precede the foaming-agent solution. This may be fresh water or a brine of controlled composition to decrease adverse effects of ions, such as calcium, which may be incompatible with some foaming agents and polymers. A batch of water may also be injected after the foaming-agent solution and before the gas which is injected to form the foam. This prevents premature mixing of the solution and gas with possible premature formation of a foam plug too close to the well through which the solution and gas are injected into the formation. Still other alternates and variations will occur to those skilled in the art. Therefore, we do not wish to be limited by the examples given but only by the following claims.

We claim:

1. In a process for plugging an earth formation with foam, in which process an aqueous solution of a water-soluble foaming agent is injected into the formation and a gas is caused to flow through said solution to generate foam in the formation, the improvement comprising including in said aqueous solution at least about 1 percent by weight of a water-soluble, film-forming polymer compatible with said foaming agent, stable at formation temperature capable of penetrating the pores of the formation, in water solution, to a distance of several feet, having a molecular weight sufficiently high to provide a melting point above formation temperature, and having a molecular weight sufficiently low to form aqueous solutions having viscosities low enough to permit displacing into said formation a solution containing at least about 1 percent by weight of the polymer.

2. The process of claim 1 in which a plasticizer for said polymer is added to said solution.

3. The process of claim 1 in which said polymer is selected from the group consisting of polyvinyl alcohols and polyvinyl pyrrolidones.

4. The process of claim 3 in which glycerine is added to said solution as a plasticizer for said polymer.

5. The process of claim 1 in which said formation is an oil-bearing formation, said polymer increasing the stability of the foam in the presence of the oil.

6. The process of claim 1 in which the temperature of said formation is at least about 100°F., said polymer increasing the stability of the foam at the elevated temperature.

7. In a process for plugging an earth formation with foam in which process an aqueous solution of a water-soluble foaming agent is injected into the formation and a gas is caused to flow through said solution to generate foam in the formation, the improvement comprising including in said solution from about 1 to about 5 percent by weight of a polymer selected from the group consisting of polyvinyl alcohols and polyvinyl pyrrolidones and from 0 to about 10 percent by weight of glycerine.

8. The process of claim 7 in which said formation is an oil-bearing formation, said polymer increasing the stability of the foam in the presence of the oil.

9. The process of claim 7 in which the temperature of said formation is at least about 100°F., said polymer increasing the stability of the foam at the elevated temperature.